Figure 6:
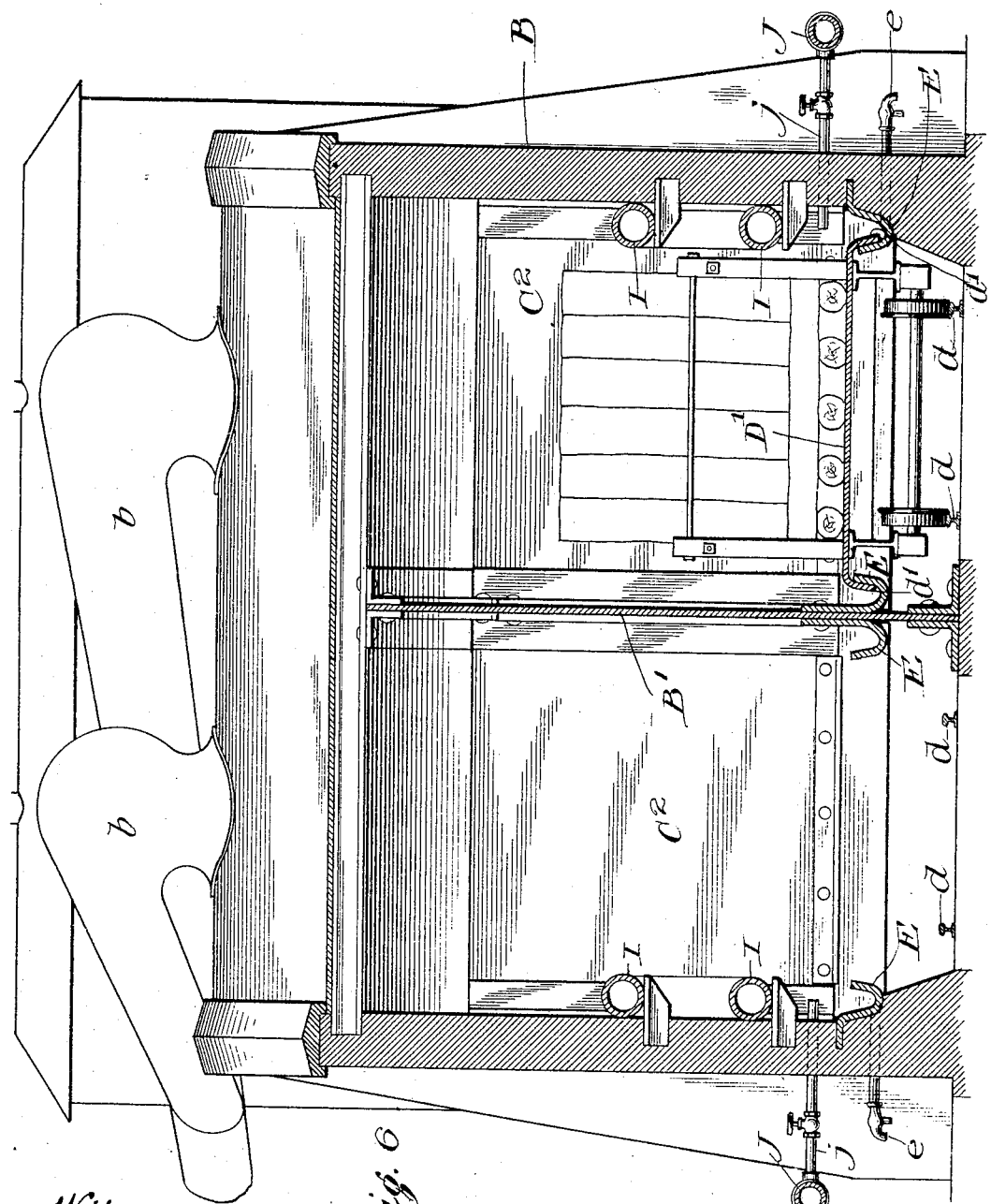

No. 782,953. PATENTED FEB. 21, 1905.
T. A. DUNGAN.
APPARATUS FOR THE DISTILLATION OF WOOD OR THE LIKE.
APPLICATION FILED JUNE 11, 1904.
5 SHEETS—SHEET 1.
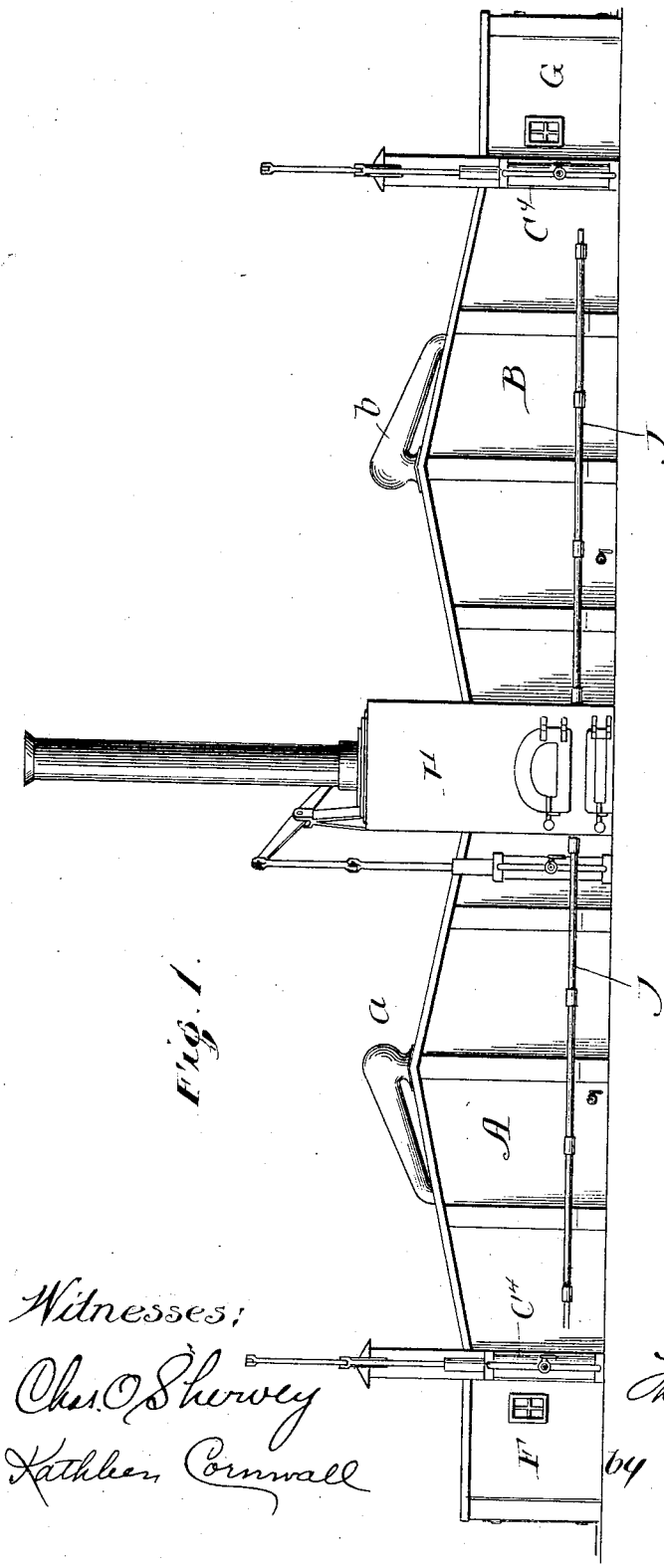

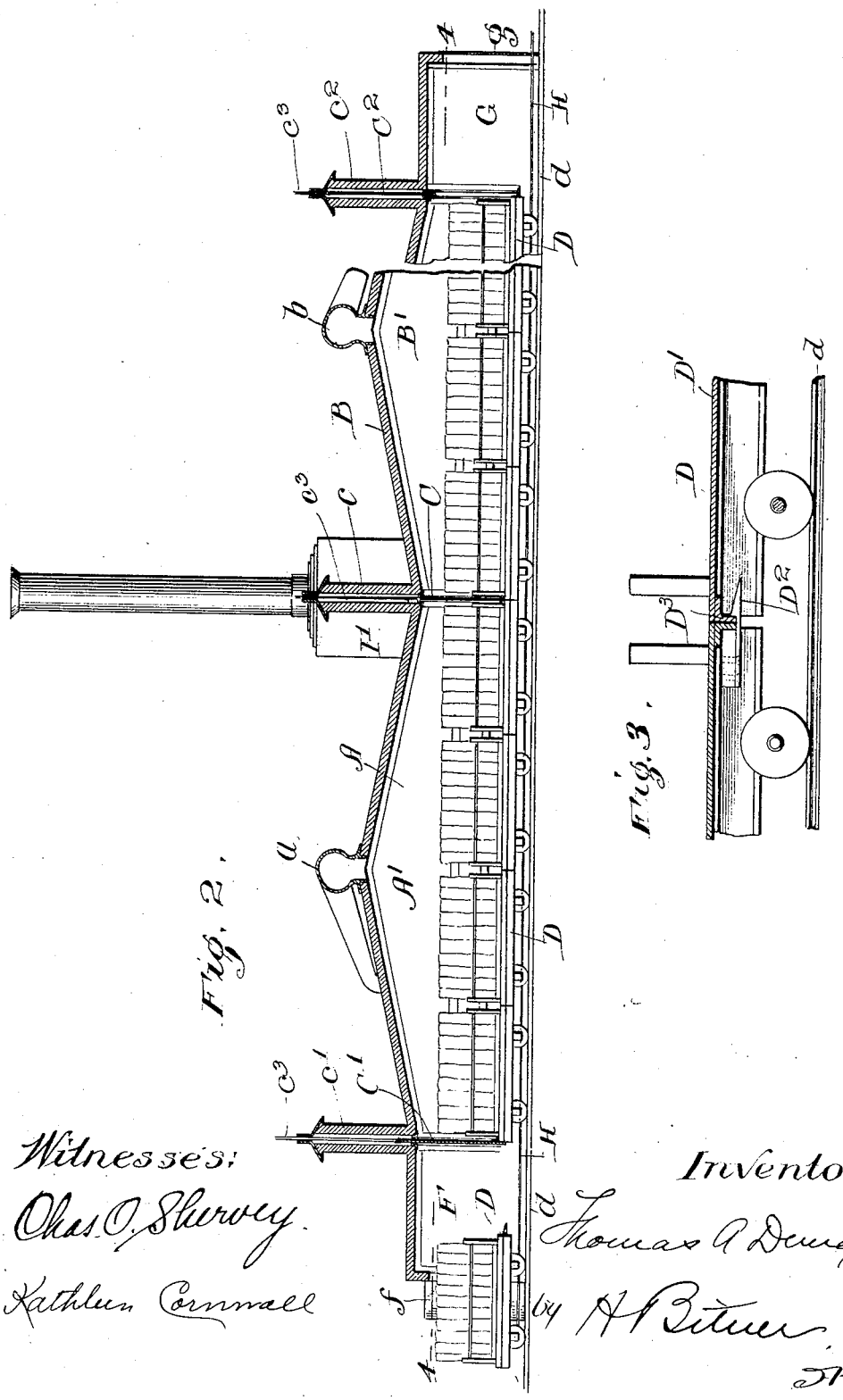

No. 782,953. PATENTED FEB. 21, 1905.
T. A. DUNGAN.
APPARATUS FOR THE DISTILLATION OF WOOD OR THE LIKE.
APPLICATION FILED JUNE 11, 1904.
5 SHEETS—SHEET 3.
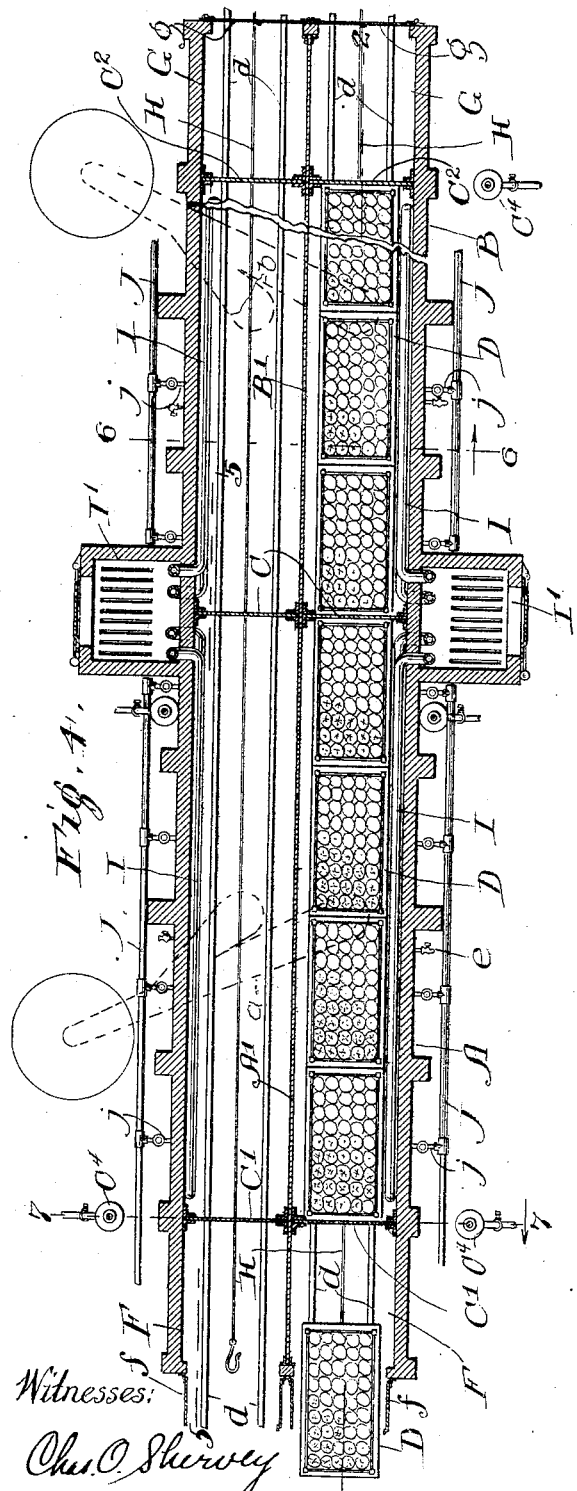
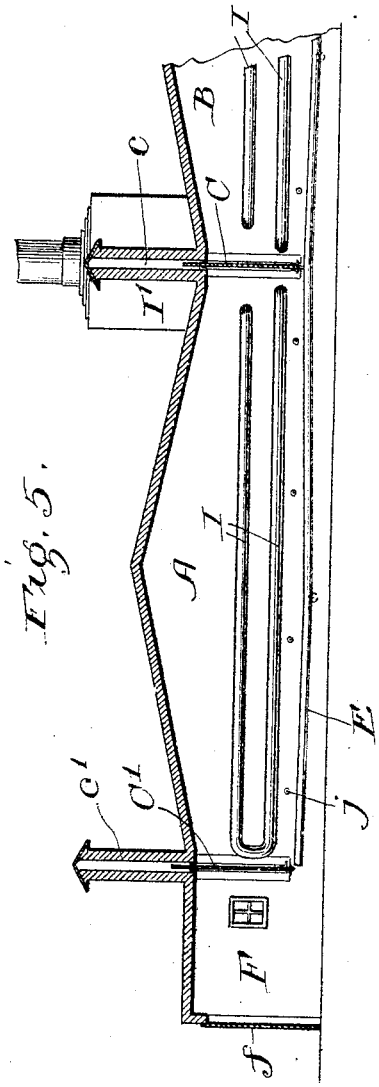
Witnesses:
Chas. O. Shirvey
Kathleen Cornwall
Inventor:
Thomas A. Dungan
by H. Bitner
Atty.

No. 782,953. PATENTED FEB. 21, 1905.
T. A. DUNGAN.
APPARATUS FOR THE DISTILLATION OF WOOD OR THE LIKE.
APPLICATION FILED JUNE 11, 1904.

5 SHEETS—SHEET 4.

Witnesses:
Chas. O. Shurvey
Kathleen Cornwall

Inventor:
Thomas A. Dungan
by H. Bitner
Atty.

No. 782,953. PATENTED FEB. 21, 1905.
T. A. DUNGAN.
APPARATUS FOR THE DISTILLATION OF WOOD OR THE LIKE.
APPLICATION FILED JUNE 11, 1904.
5 SHEETS—SHEET 5.
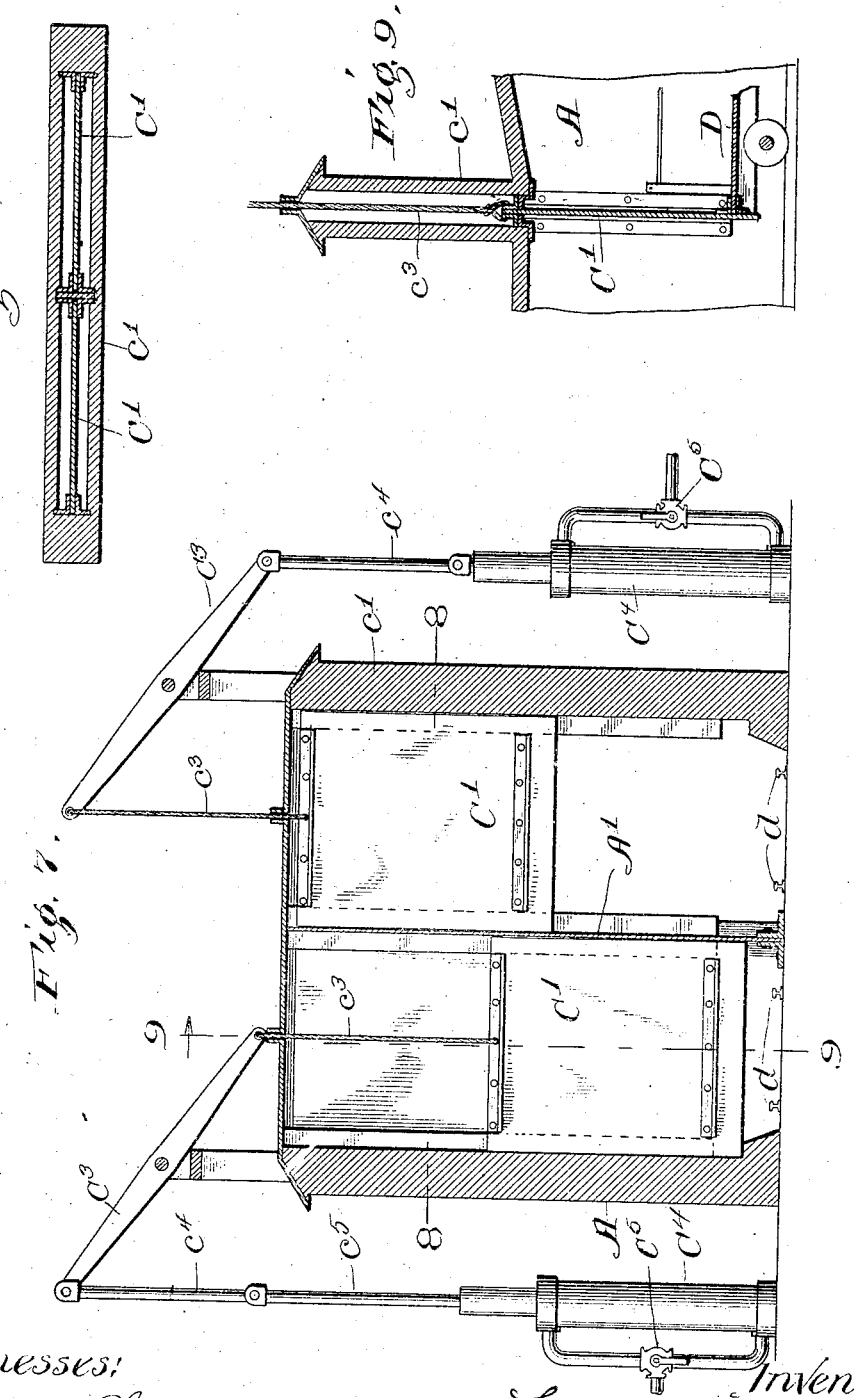

No. 782,953. Patented February 21, 1905.

UNITED STATES PATENT OFFICE.

THOMAS A. DUNGAN, OF KIPLING, ALABAMA.

APPARATUS FOR THE DISTILLATION OF WOOD OR THE LIKE.

SPECIFICATION forming part of Letters Patent No. 782,953, dated February 21, 1905.

Application filed June 11, 1904. Serial No. 212,069.

*To all whom it may concern:*

Be it known that I, THOMAS A. DUNGAN, a citizen of the United States of America, residing at Kipling, in the county of Mobile and State of Alabama, have invented certain new and useful Improvements in Apparatus for the Distillation of Wood or the Like, of which the following is a specification.

My invention relates to certain new and useful improvements in apparatus for the distillation of wood and the like; and its object is to produce a device that will have certain advantages which will appear more fully and at large in the course of this specification.

To this end my invention consists in certain novel features of construction, which are clearly illustrated in the accompanying drawings and described herein.

In the aforesaid drawings, Figure 1 is a side elevation of my improved apparatus. Fig. 2 is a longitudinal section through the same in the line 2 2 of Fig. 4. Fig. 3 is a longitudinal vertical section through the adjacent ends of two cars. Fig. 4 is a horizontal section in the line 4 4 of Fig. 2. Fig. 5 is a longitudinal vertical section in the line 5 5 of Fig. 4. Fig. 6 is a transverse section in the line 6 6 of Fig. 4 looking in the direction of the arrow. Fig. 7 is a transverse vertical section in the line 7 7 of Fig. 4 looking in the direction of the arrow. Fig. 8 is a horizontal section in the line 8 8 of Fig. 7, and Fig. 9 is a longitudinal vertical section in line 9 9 of Fig. 7 looking in the direction of the arrow.

Referring to the drawings, it will be seen that my improved distilling apparatus is provided with two retorts A B, placed end to end. These two retorts may be constructed of any desired material capable of withstanding heat, and in the preferred form of construction each is divided into two smaller compartments by a central longitudinal wall $A'$ $B'$. Eduction-pipes $a$ $b$ are provided in the tops of the retorts, said pipes leading to condensing-worms of the ordinary type. The adjacent compartments in the two retorts communicate with each other at their ends to form two longitudinal passages which extend throughout the entire structure, and these two passages are equipped with the same distilling apparatus, so that to all intents and purposes the structure herein illustrated is a double retort, each side performing its function independent of the other. The products of distillation, however, from the two sides pass into the same worm. It will be evident, therefore, that a narrower structure can be built having only a single longitudinal passage. In the drawings hereto annexed certain of the operating devices are illustrated in one passage and certain in the other; but the construction of the two is the same, and therefore only one will be described.

The two adjacent longitudinal compartments in the retorts A B are separated by a vertically-movable gate C, which is adapted to rise into a hollow wall $c$, and the ends of the said compartments are closed by similar gates $C'$ $C^2$, adapted to rise into hollow walls $c'$ and $c^2$, respectively. Cars D are provided, which run on suitable rails $d$, which extend through the entire length of the structure. Each of the cars D has a sheet-metal floor $D'$, having downturned edges $d'$, which engage with troughs E, which extend from end to end of the side walls of the longitudinal passages. These troughs slant downward slightly toward the middle of the two retorts, as illustrated in Fig. 5, and stop-cocks $e$ are provided by which the contents of the troughs may be led off. Each car D is provided at its forward end with a spring-catch $D^2$ and at its rear end with an engagement-piece $D^3$, adapted to be engaged by the catch of another car, as illustrated in Fig. 3. Vestibules F G, having swinging doors $f$ $g$, are provided at the ends of the retorts, each of said vestibules being of sufficient size to hold a single car. A cable H runs through each of the passages and communicates with a suitable source of power.

In practice the retort is filled from the gate $C'$ to the $C^2$ with cars loaded with the wood to be operated on and the gates closed. A car is slid into the vestibule F, as illustrated in Fig. 2, the end of the cable H is secured to it, the doors $f$ of vestibule closed, and the three gates C $C'$ $C^2$ opened. Power is then applied to the cable, drawing the last car from the vestibule into the rear of the retort and pushing the forward car out into the vestibule G. The gates C C' C² are then closed, the vestibule G is opened, and the car removed. The end of the cable is then drawn back for attachment to another car. In this way a continuous series of cars can be drawn through the retorts without at any time opening the retorts proper to the air. Suitable heating devices and devices for injecting superheated steam into the retorts are provided, the same to be hereinafter described, and by the influence of heat and superheated steam the wood is distilled. The products of distillation in part pass out of the pipes $a b$ and in part condense on the walls of the retort and flow down into the troughs E, heretofore described. These products are to a large extent pitchy in their nature and cover the overhanging edges $d'$ of the car-platforms, thus making a tight closure between the upper part of the retorts and the lower part in which the running-gear of the cars is situated. By this means the running-gear is protected from the influence of the heat and the accumulation of resinous matter, and the heat which would otherwise be utilized in heating up the running-gear of each car is saved. It is to be noted that the platforms of the cars are constructed to fit tightly together, Fig. 3, so as to permit the escape of as little heat as possible. This concludes in a general way the description of the device. Certain details of construction, however, are of considerable importance and will now be set forth.

The construction and operation of the gates C C' C² is illustrated in Figs. 7, 8, and 9, where it will be seen that these gates are made in the form of sheet-metal plates guided between parallel angle-irons and provided at their upper ends with ropes or cables $c^3$, secured to the ends of walking-beam levers $C^3$, the opposite ends of which are connected by links $c^4$ to piston-rods $c^5$ in cylinders $C^4$, into either end of which a fluid under pressure can be introduced by means of three-way cocks $C^5$ to raise and lower the gates.

The heating system is illustrated in Figs. 4 and 5, from which it will be seen that pipes I run into the retort, being supported upon the said walls. These pipes lead from heaters I' and maintain the temperature of the retort at any desired point. Along the outer walls of the retort are steam-pipes J, from which a plurality of laterally-extending pipes $j$ enter the said walls. The pipe J carries superheated steam, which is discharged through the pipe $j$ and greatly assists in the distilling process.

I realize that considerable variation is possible in the details of this construction without departing from the spirit of the invention, and I therefore do not intend to limit myself to the specific form herein shown and described.

I claim as new and desire to secure by Letters Patent—

In a device of the class described the combination with a retort open at both ends, and a track running through the retort, of a series of cars, means for propelling them through the retort, troughs on the sides of the retort, substantially at the level of the floors of the cars, the floors of the cars being turned down at their edges to engage with the troughs, gates adapted to close the space at the ends of the retort above the floors of the cars, and means for drawing off the contents of said troughs.

In witness whereof I have signed the above application for Letters Patent, at Chicago, in the county of Cook and State of Illinois, this 2d day of June, A. D. 1904.

THOMAS A. DUNGAN.

Witnesses:
CHAS. O. SHERVEY,
KATHLEEN CORNWALL.